United States Patent
Zhang et al.

(10) Patent No.: US 11,341,736 B2
(45) Date of Patent: May 24, 2022

(54) METHODS AND APPARATUS TO MATCH IMAGES USING SEMANTIC FEATURES

(71) Applicant: Intel Corporation, Santa Clara, CA (US)

(72) Inventors: Yimin Zhang, Beijing (CN); Haibing Ren, Beijing (CN); Wei Hu, Beijing (CN); Ping Guo, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 64 days.

(21) Appl. No.: 16/768,559

(22) PCT Filed: Mar. 1, 2018

(86) PCT No.: PCT/CN2018/077760
§ 371 (c)(1),
(2) Date: May 29, 2020

(87) PCT Pub. No.: WO2019/165626
PCT Pub. Date: Sep. 6, 2019

(65) Prior Publication Data
US 2021/0174134 A1    Jun. 10, 2021

(51) Int. Cl.
*G06V 10/75* (2022.01)
*G06K 9/62* (2022.01)
*G06V 10/20* (2022.01)
*G06V 10/46* (2022.01)

(52) U.S. Cl.
CPC ......... *G06V 10/757* (2022.01); *G06K 9/6228* (2013.01); *G06V 10/255* (2022.01); *G06V 10/462* (2022.01)

(58) Field of Classification Search
CPC .. G06K 9/6211; G06K 9/3241; G06K 9/4671; G06K 9/6228; G06V 10/757; G06V 10/255; G06V 10/462
See application file for complete search history.

(56) References Cited

U.S. PATENT DOCUMENTS

| | | | |
|---|---|---|---|
| 9,152,882 B2 * | 10/2015 | Hedau | G06K 9/6227 |
| 9,367,897 B1 * | 6/2016 | Chen | G06T 7/33 |
| 9,727,974 B2 * | 8/2017 | Chen | G06T 3/4007 |
| 10,282,672 B1 * | 5/2019 | Mishra | G06N 3/088 |

(Continued)

OTHER PUBLICATIONS

Calonder et al., "BRIEF: Binary Robust Independent Elementary Features" (Year: 2010).*

(Continued)

*Primary Examiner* — Aaron W Carter
(74) *Attorney, Agent, or Firm* — Hanley, Flight & Zimmerman, LLC (57) ABSTRACT

Methods and apparatus to match images using semantic features are disclosed. An example apparatus includes a semantic labeler to determine a semantic label for each of a first set of points of a first image and each of a second set of points of a second image; a binary robust independent element features (BRIEF) determiner to determine semantic BRIEF descriptors for a first subset of the first set of points and a second subset of the second set of points based on the semantic labels; and a point matcher to match first points of the first subset of points to second points of the second subset of points based on the semantic BRIEF descriptors.

27 Claims, 7 Drawing Sheets

(56) References Cited

U.S. PATENT DOCUMENTS

| | | |
|---|---|---|
| 2008/0015843 A1 | 1/2008 | Barghout |
| 2009/0316990 A1 | 12/2009 | Nakamura et al. |
| 2015/0138310 A1 | 5/2015 | Fan et al. |
| 2015/0154456 A1* | 6/2015 | Pau ..................... G06K 9/4671 |
| | | 382/201 |
| 2016/0171656 A1* | 6/2016 | Chen ........................ G06T 7/33 |
| | | 382/300 |
| 2016/0253784 A1* | 9/2016 | Chen .................... G06T 3/0056 |
| | | 382/300 |
| 2017/0006261 A1 | 1/2017 | Debilde et al. |
| 2021/0174134 A1* | 6/2021 | Zhang ................. G06K 9/3241 |
| 2021/0182596 A1* | 6/2021 | Adams ................ G06K 9/6256 |

OTHER PUBLICATIONS

International Searching Authority, "International Search Report", issued in connection with International Application No. PCT/CN2018/077760, dated Dec. 7, 2018 (4 pages).

International Searching Authority, "Written Opinion", issued in connection with International Application No. PCT/CN2018/077760, dated Dec. 7, 2018 (4 pages).

* cited by examiner

METHODS AND APPARATUS TO MATCH IMAGES USING SEMANTIC FEATURES

RELATED APPLICATION

This patent arises from a national stage application of PCT Application Serial Number PCT/CN2018/077760, which was filed on Mar. 1, 2018. PCT Application Serial Number PCT/CN2018/077760 is hereby incorporated herein by reference in its entirety. Priority to PCT Application Serial Number PCT/CN2018/077760 is hereby claimed.

FIELD OF THE DISCLOSURE

This disclosure relates generally to image processing and, more particularly, to methods and apparatus to match images using semantic features.

BACKGROUND

Point description and matching in a fundamental step for many computer vision tasks. For example, point description and matching may be used for stereo matching, image stitching, motion estimation, etc. As automated and/or semi-automated devices such as robots, drones, autonomous driving, etc. become more popular, improvements in point description and matching between image data obtained by a sensor improves the overall performance of such automated and/or semi-automated devices. For example, as a robot travels within an environment, the robot gathers images with differing orientation. Accordingly, the robot needs to be able to match objects from two or more obtained images that are taken in different orientations in order to property navigate and/or interact with the objects of the environment.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Point description and matching are important and highly utilized protocols for many computer vision tasks. For example, in robotic mapping and/or navigation, simultaneous localization and mapping (SLAM) constructs maps of unknown environment using point detection and matching protocols. As the use of autonomous vehicles, drones, robots, etc. become more prevalent, more efficient point description and matching protocols become more important.

Some conventional techniques for point description and matching (e.g., scale-invariant feature transform (SIFT) or speed up robust features (SURF)), include finding local extreme in a difference of Gaussians (DoG) space and defining a descriptor as a gradient histography or using integer approximation of a determinant of a Hessian blob detector. However, SIFT or SURF have high computational costs. Accordingly, neither SIFT of SURF is not fast enough for many real-time application (e.g., such as SLAM). Other conventional techniques (e.g., Oriented FAST and Rotated BRIEF (ORB)), corresponds to a features from accelerated segment test (FAST) detector and a binary robust independent element features (BRIEF) descriptor, reducing the computational costs needed for point description and matching. For example, ORB cost $\frac{1}{100}$ the computation time of SIFT and $\frac{1}{10}$ the computational time of SURF. However, the ORB technique introduces ambiguity of its feature descriptor due to its simplicity, thereby reducing the accuracy of the results. Additionally, such conventional techniques cannot handle complex images (e.g., large viewpoint changes) because such conventional techniques only consider low level features (e.g., pixel gradient, intensity, and color). Accordingly, misalignments are common using such conventional techniques due to the ambiguity of such low-level descriptors. Examples disclosed herein perform point description and matching using a combination of low level descriptor(s) with a high-level descriptor corresponding to semantics.

A semantic feature is a feature of an image that describes the visual content of an image by correlating low level features such as color, gradient orientation, etc. with the content of an image scene. For example, a semantic feature may correlate an extracted color such as blue with the sea or the sky. Examples disclosed herein include a new point description that combines the high level semantic features and low-level intensity features, thereby providing a more complete image representation and a more accurate point matching. Using examples disclosed herein, key points of two images are assigned with a set of candidate matching labels and point matching is conducted between points that have the same semantic label, thereby corresponding to a significant reduction of point mismatching. Examples disclosed herein provide a more accurate point matching then the above-described conventional techniques with less conventional time than both SIFT and SURF.

Figure 1:
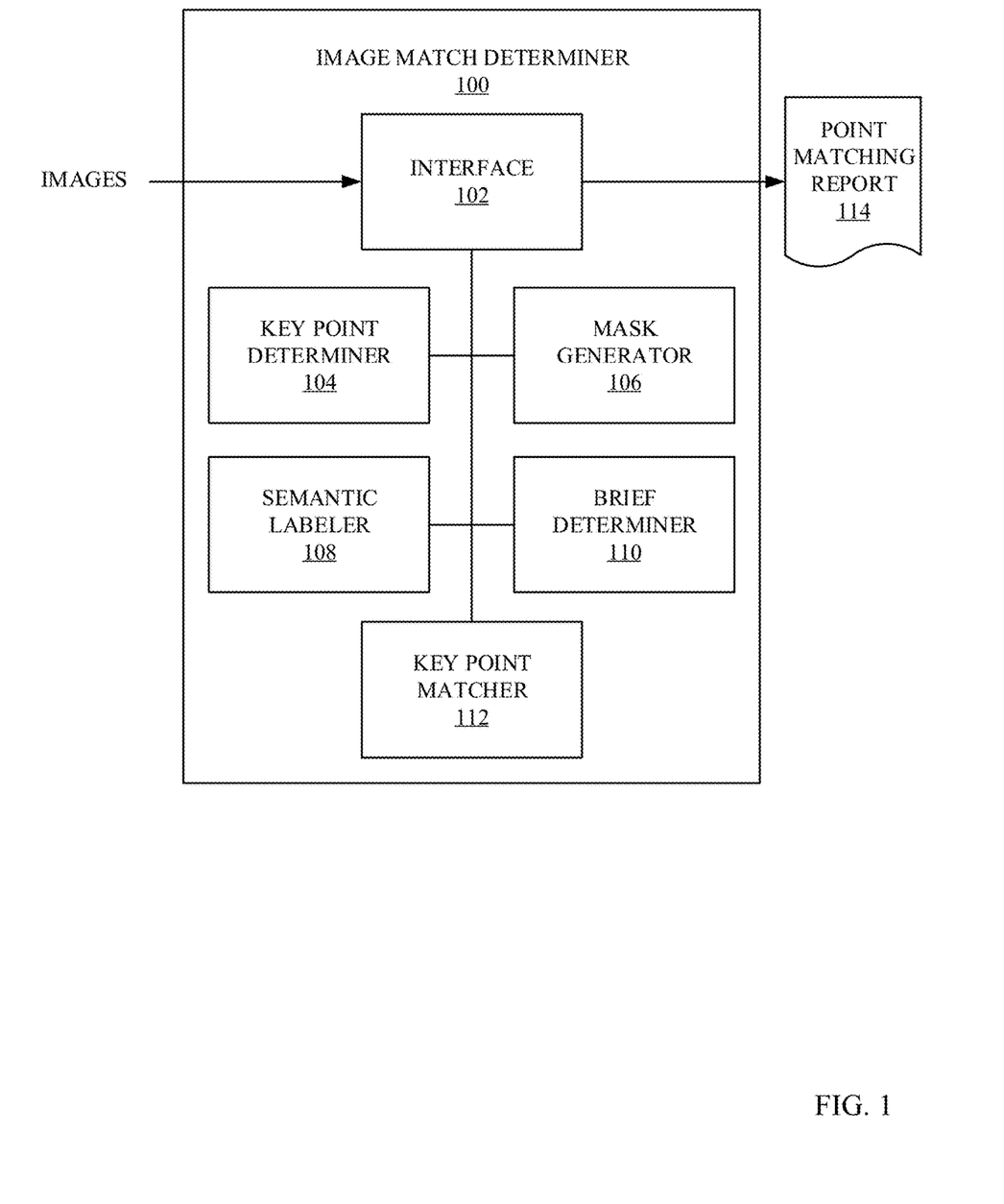
FIG. 1 is an example image match determiner to match two images using semantic features.

FIG. 1 illustrates an example image match determiner 100 to match two images using semantic features. The example image match determiner 100 of FIG. 1 includes an example interface 102, an example key point determiner 104, an example mask generator 106, an example semantic labeler 108, an example semantic BRIEF determiner 110, and an example key point matcher 112. The example image match determiner 100 generates an example point matching report 114.

The example image match determiner 100 of FIG. 1 is a device that is capable of matching objects that are located within two or more images, regardless of the orientation of the two images. For example, the image match determiner 100 may match one or more points on a chair from two images taken at two different points in the same room. In some examples, the image match determiner 100 is located within a robotic and/or automated/semi-automated device. For example, the image match determiner 100 may be implemented in a robot, drone, autonomous vehicle, etc. to identify an object as the robotic device captures image of the object while moving. Accordingly, the example image match determiner 100 may provide the results of imaging mapping to another processor to perform a function.

The example interface 102 of FIG. 1 receives images from an image capture sensor (e.g., a camera) and/or from another processor. The example interface 102 initiates an image matching processes when the interface 102 receives instructions (e.g., from a user or other device) and/or when the interface 102 receives two or more images to match. Additionally, the example interface 102 generates the example point matching report 114. In some examples, the interface 102 generates the point matching report 114 to be a signal (e.g., corresponding to data packets) that is transmitted to a processor for further processing.

The example key point determiner 104 of FIG. 1 detects key points of a received image. In some examples, the key point determiner 104 detects the key points of a received image using an oriented FAST detector technique. Alternatively, any point detection technique may be used to detect key points of a received image. Additionally, the example key point determiner 104 groups key points into two groups: a "within the object region" group ($P^O$) and an "on the object boundary" group ($P^B$). For example, the key point determiner 104 may divide the key points using Equation 1.

$$\begin{cases} M^O(p) = 1 \text{ and } M^B(p) = 0, \text{if } p \in P^O \\ M^B(p) = 1 \text{ and } M^O(p) = 0, \text{if } p \in P^B \end{cases} \quad \text{(Equation 1)}$$

In Equation 1, $M^O$ corresponds to an object mask, and $M^B$ corresponds to a boundary mask, as further described below. Alternatively, Equation 1 may be used to group the key points using only the object mask or only the boundary mask. In some examples, when an image includes a boundary (e.g., a car), the example key point determiner 104 places each point corresponding to the boundary of the car in the "on the object boundary" group and places points corresponding to the car that are not on the boundary in the "within the object region" group. The example key point determiner 104 orders the points in both groups using a Harris method, where point within the objects region have higher priority than those on the boundary. For example, the Harris method may include a Harris corner detector to detect points of concerns whose local neighborhood stands in two dominant and different edge directions. The Harris method may also include measuring the corner points which take the differential of a corner score to account with respect to its direction. After the key points have been ordered, the example key point determiner 104 selects K top key points from the order. To get a more accurate, but slower, image matching, K may be higher (e.g., 1,000-10,000 key points). To get a faster, but less accurate, image matching K may be lower (e.g., 100-1,000 key points).

The example mask generator 106 of FIG. 1 generates a semantic segmentation mask, an object mask, and a boundary mask of a received image. To generate the semantic segmentation mask, the example mask generator 106 segments the image in the semantic level. For example, the mask generator 106 may employ a SegNet function to an image to generate a semantic segmentation image. Alternatively, any other image segmentation may be used. An example of a semantic segmentation image is further described below in conjunction with FIG. 6. The example mask generator 106 generates the object mask as a binary image defining the object region of an image. For example, given an impute image and a semantic segmentation of the image (S), the mask generator 106 generates the object mask $M^O$ using Equation 2.

$$M^O = \Sigma_{l=1}^{L} \text{Erode}(S,l) \quad \text{(Equation 2)}$$

In Equation 2, L is the number of semantic labels (e.g., determined by the example semantic labeler 108) identified in the image, and Erode is an erode operation of the semantic segmentation image for each identified semantic label. An example object mask is further described below in conjunction with FIG. 6. The example mask generator 106 generates the boundary mask of an image as a binary image which defines the boundary image (e.g., the inverse of the object mask) using Equation 3.

$$M^B = 1 - M^O \quad \text{(Equation 3)}$$

An example boundary mask is further described below in conjunction with FIG. 6. The object mask and/or the boundary mask may be used to group points into different groups.

The example semantic labeler 108 of FIG. 1 assigns semantic labels for pixels and/or key points of an image. In this manner, the example semantic labeler 108 can determine the total number of semantic labels of an image (e.g., L of the above Equation 1). The semantic labels correspond to objects. For example, when the example mask generator 106 generates the semantic segmentation image, the semantic labeler 108 compares semantic objects in the semantic segmentation image to objects stored in a database to identify the semantic objects. Accordingly, the example semantic labeler 108 labels points (e.g., pixels) within the semantic objects based on the identified object (e.g., identified by the comparison). Additionally or alternatively, after the key point determiner 104 selects the top K key points, the example semantic labeler 108 may assign single matching labels to the top key points that are in the "within the object region" group and may assign multiple semantic matching labels to the top key points that are in the "on the object boundary" group for key point matching.

The example BRIEF determiner 110 of FIG. 1 performs a BRIEF function based on the semantic segmentation image and/or based on the received image to generate a semantic descriptor and/or an intensity descriptor of the received image. For example, the example BRIEF determiner 110 generates a semantic descriptor (fS) (e.g., a bit string) for each point of a received image by performing a binary test on the high level semantic information of the received image based on sampled positions ($x_i$, $y_i$) in a patch around the center of each point (p) of the image with Gaussian distribution, as shown in Equation 4.

$$fS(p) := \Sigma_{1 \leq i \leq N} 2^{i-1} \tau(S, x_i, y_i) \quad \text{(Equation 4)}$$

In Equation 4, p is a key point of the image, and N is a predefined number (e.g., 256) corresponding to how many patches to process around point p, and $\tau(S, x_i, y_i)$ is a semantic binary test where $\tau(S, x_i, y_i) = 1$, when $S(x) = S(y)$ and $\tau(S, x_i, y_i) = 0$ when $S(x) \neq S(y)$ Additionally, the example BRIEF determiner 110 generates an intensity descriptor (fI) (e.g., a bit string) for each point of a received image by performing a binary test on the low level intensity information of the received image based on sampled positions ($x_i, y_i$) in a patch around the center of each point (p) of the image with Gaussian distribution, as shown in Equation 5.

$$fI(p) := \Sigma_{1 \leq i \leq N} 2^{i-1} \tau(I, x_i, y_i) \quad \text{(Equation 5)}$$

In Equation 5, p is a key point of the image, and N is a predefined number (e.g., 256) corresponding to how many patches to process around point p, and $\Sigma(I, x_i, y_i)$ is an intensity binary test where $\tau(I, x_i, y_i) = 1$, when $I(x) < I(y)$ and $\tau(I, x_i, y_i) = 0$ when $I(x) \geq I(y)$. Accordingly, the example BRIEF determiner 110 defines the final feature descriptor as a combination of the semantic and intensity bit strings.

The example key point matcher 112 of FIG. 1 matches the two or more images received by the example interface 102 by selecting candidate matches for top key points of the first image with top key points of the second image when the two key points correspond to a same matching label (e.g., determined by the example semantic labeler 108) and/or when the two key points correspond to the same grouping (e.g., "on the object boundary" or "within the object region"). Once the example key point matcher 112 determines all the candidate matches for top key points, the example key point matcher 112 performs a hamming distance measure corresponding to the semantic descriptor and/or the intensity descriptor for each candidate match, as shown below in Equation 6.

$$D(p,q)=\alpha H(fS(p),fS(q))+(1-\alpha)H(fI(p),fI(q)) \quad \text{(Equation 6)}$$

In Equation 6, p and q are two candidate matching points, D(p, q) is the distance between two descriptors of p and q, H(x) is a hamming function, and $\alpha$ is a weighting factor between semantic bit string and intensity bit string. $\alpha$ may be set to any value between 1 and 0 (e.g., including 1 and 0) based on user and/or manufacture preferences. The example key point matcher 112 matches key points of the two images based on the smallest hamming distance measurement (e.g., $D(a_i, b_i)$) between all candidate pairs (e.g., $a_i$ and $b_i$), as shown below in Equation 7.

$$\hat{q}=\text{argmin}(D(a_i,b_i)), \text{subject to } L(a_i) \cap L(b_i)!=0 \text{ and } M^O(a_i)==M^O(b_i) \quad \text{(Equation 7)}$$

In Equation 7, $\hat{q}$ is a matched point, $a_i$ and $b_i$ represent candidate points of the two images for matching, L(a) represents the matching label(s) of the candidate point, and argmin is an "arguments of the minima" function. Accordingly, Equation 7 represents the best match between candidate matching pairs that correspond to a same matching label and a same group (e.g., the "on the object boundary" group or the "within the object region" groups).

While an example manner of implementing the image match determiner 100 is illustrated in FIG. 1, one or more of the elements, processes and/or devices illustrated in FIG. 1 may be combined, divided, re-arranged, omitted, eliminated and/or implemented in any other way. Further, the example interface 102, the example key point determiner 104, the example mask generator 106, the example semantic labeler 108, the example BRIEF determiner 110, the example key point matcher 112, and/or, more generally, the example image match determiner 100 of FIG. 1 may be implemented by hardware, software, firmware and/or any combination of hardware, software and/or firmware. Thus, for example, any of the example interface 102, the example key point determiner 104, the example mask generator 106, the example semantic labeler 108, the example BRIEF determiner 110, the example key point matcher 112, and/or, more generally, the example image match determiner 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 102, the example key point determiner 104, the example mask generator 106, the example semantic labeler 108, the example BRIEF determiner 110, the example key point matcher 112, and/or, more generally, the example image match determiner 100 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example image match determiner 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the image match determiner 100 of FIG. 1 are shown in FIGS. 2-5. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 2-5, many other methods of implementing the example image match determiner 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 2-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 2:
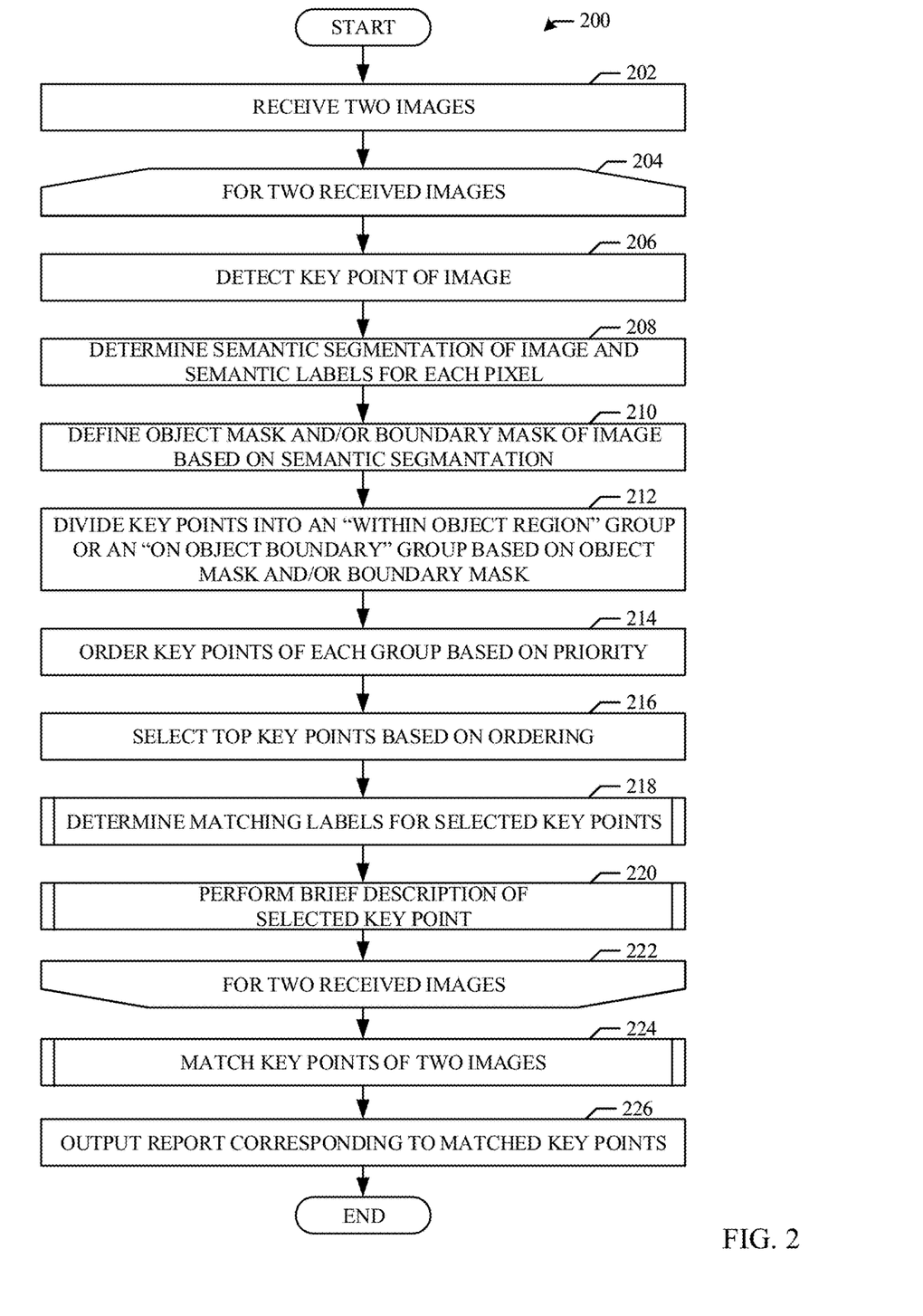
FIGS. 2-5 are flowcharts representative of example machine readable instructions that may be executed to implement the example image match determiner of FIG. 1.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 2 illustrates an example flowchart 200 representative of example machine readable instructions that may be executed by the example image match determiner 100 of FIG. 1 to match images using semantic features.

At block 202, the example interface 102 receives two images and/or instructions to match two images. For the two received images (block 204-block 222), the example key point determiner 104 detects the key points of the received image (block 206). As described above, the key point determiner 104 may use an oriented FAST detection and/or any other point detection method to detect the key points. At block 208, the example mask generator 106 determines the semantic segmentation of the image and the semantic labels for each pixel of the received image. For example, the mask generator 106 may employ a SegNet function and/or any other segmentation function to determine a semantic segmentation image from the received image. The example mask generator 106 identifies semantic labels for each pixel by comparing objects of the semantic segmentation image to database image to identify the objects. In this manner, any pixel/point of an image that corresponds to an identified object is labeled with the corresponding semantic label.

At block 210, the example mask generator 106 defines an object mask and/or a boundary mask of the received image based on the semantic segmentation, as described above in conjunction with Equations 1 and 2. At block 212, the example key point determiner 104 divides the key points into an "within object region" ($P^O$) group or an "on object boundary" ($P^B$) group based on the object mask and/or boundary mask. For example, the key point determiner 104 may divide the key points using the above Equation 6 and/or an Equation corresponding to only the object mask or only the boundary mask. At block 214, the example key point determiner 104 orders the key points of each group based on a priority. The example key point determiner 104 may order the key points using a Harris measurement. The priority may be, for example, points on the object region having a higher priority that points on the boundary.

At block 216, the example key point determiner 104 selects the top K key points based on the ordering. As described above, K may in a high number for a more accurate key point match or K may be a low number for a faster key point match. At block 218, the example semantic labeler 108 determines matching labels for the selected key points, as further described below in conjunction with FIG. 3. At block 220, the example BRIEF determiner 110 performs a BRIEF description of the selected key points, as further described below in conjunction with FIG. 4. At block 224, the example key point matcher 112 matches the selected key points of the two images, as further described below in conjunction with FIG. 5. At block 226, the example interface 102 outputs a report corresponding to the matched key points.

Figure 3:
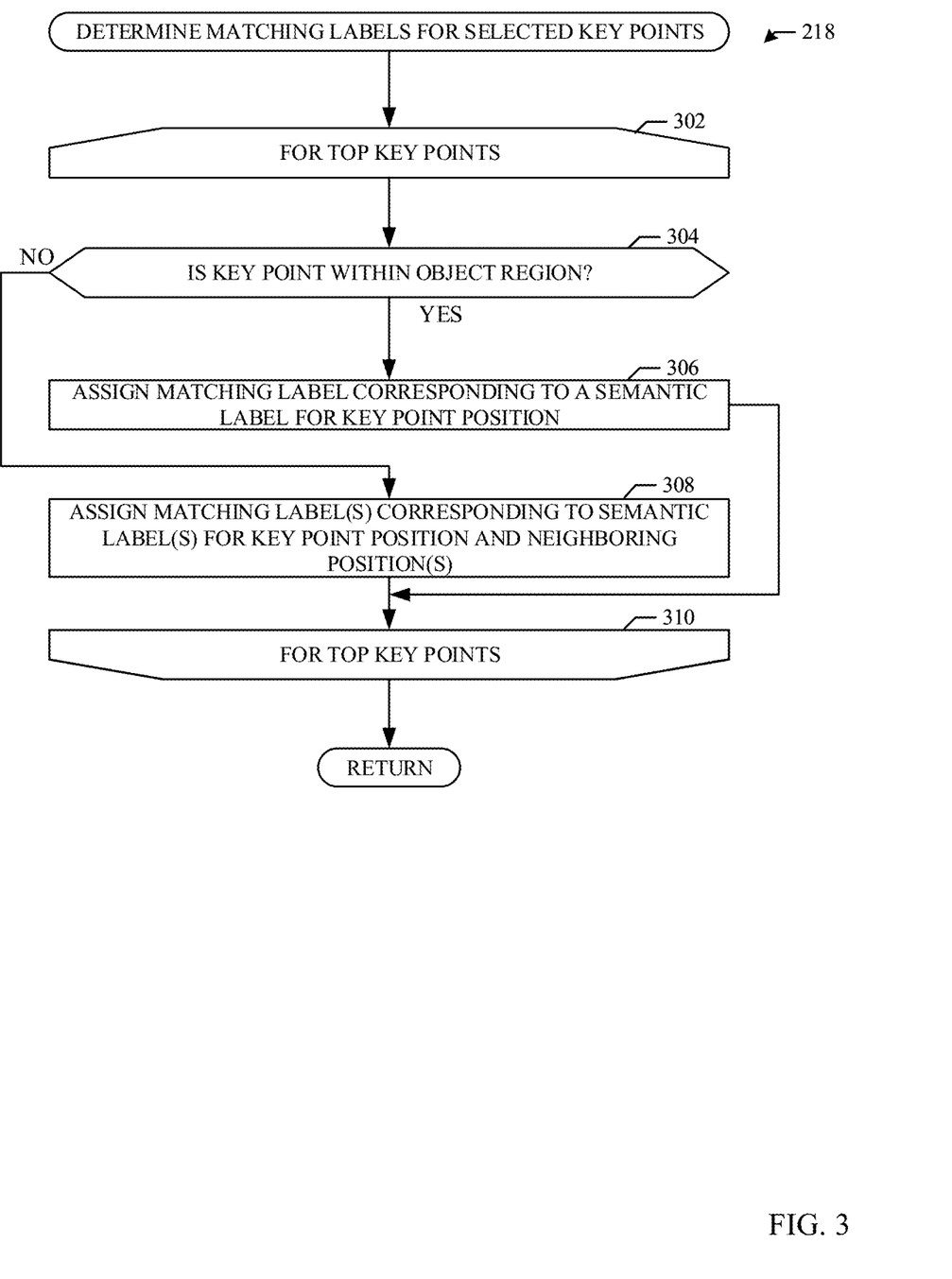

FIG. 3 illustrates an example flowchart 218 representative of example machine readable instructions that may be executed by the example image match determiner 100 of FIG. 1 to determine matching labels for selecting key points, as described above in conjunction with block 218 of FIG. 2.

For all of the selected top key points (block 302-block 310), the example key point determiner 104 determines if the key point is within the objection region (block 304). If the example key point determiner 104 determines that the key point is within the object region (block 304: YES), the example semantic labeler 108 assigns a matching label corresponding to semantic label for the key point position (block 306). For example, if the key point position corresponds to a semantic label of a chair, the example semantic labeler 108 assigns a matching label of a chair to for the key point (e.g., $L(p_1)=\{chair\}$, where $L(p)$ corresponds to the matching label of point $p_1$). If the example key point determiner 104 determines that the key point is not within the object region (block 304: NO), the example semantic labeler 108 assigns a matching labels corresponding to semantic labels for the key point position and neighboring position(s) (block 308). For example, if the key point position corresponds to a semantic label of a chair and the neighboring positions correspond to a matt and a picture frame, the example semantic labeler 108 assigns a matching label of a chair, a matt, and a picture frame to for the key point (e.g., $L(p_1)=\{chair, matt, picture frame\}$). The process may return back to block 220 of FIG. 2 when the example semantic labeler 108 assigns matching labels for the top key point.

Figure 4:
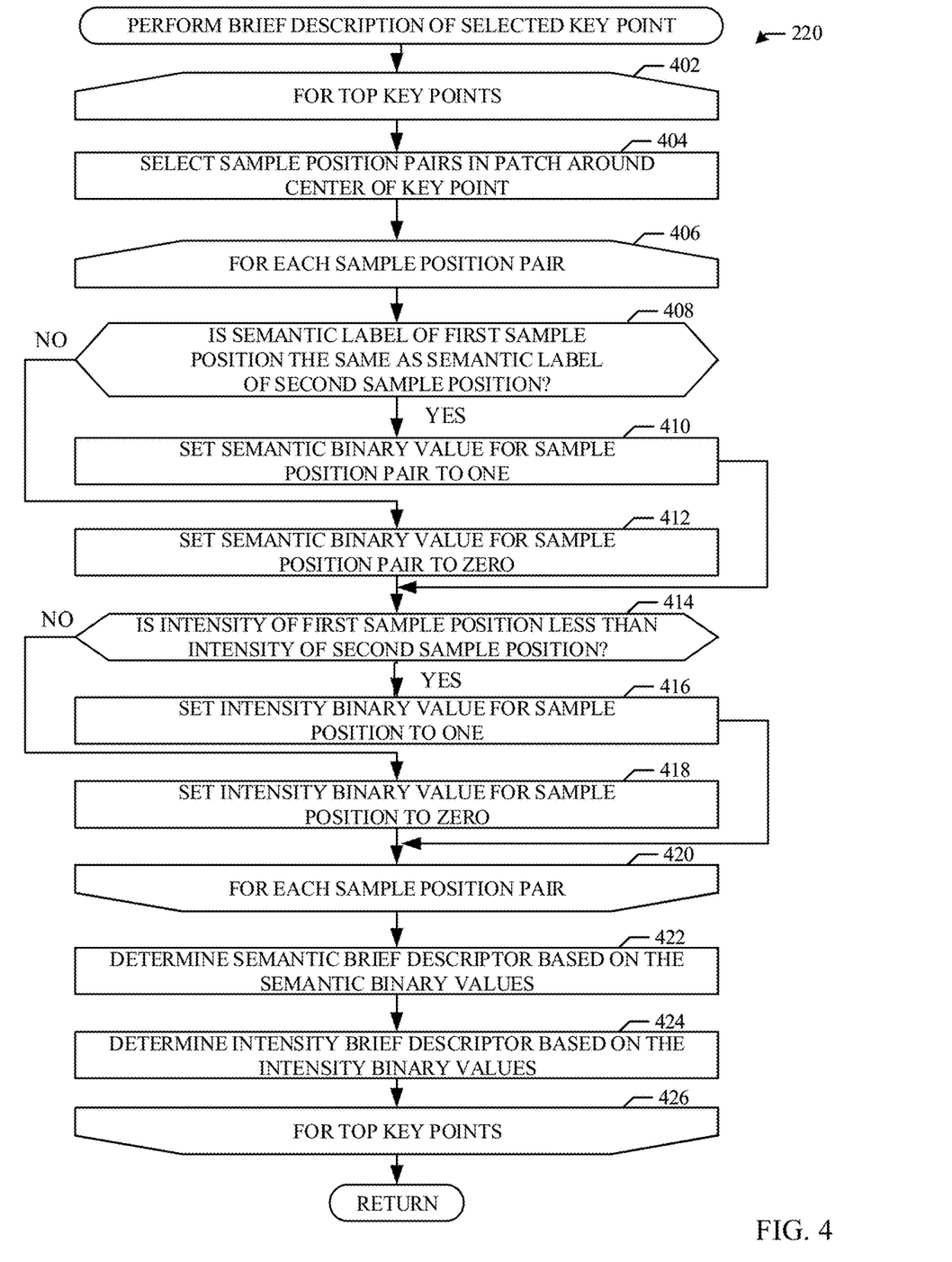

FIG. 4 illustrates an example flowchart 220 representative of example machine readable instructions that may be executed by the example image match determiner 100 of FIG. 1 to perform a BRIEF description of the top selected key points, as described above in conjunction with block 220 of FIG. 2.

For each of the top key points (block 402-426), the example BRIEF determiner 110 selects sample position pairs (e.g., points near the top key point) in a patch around the center of the top key point (block 404). The number of sample position pairs may be predefined based on user and/or manufacture preferences. For each of the selected sample position pairs (block 406-block 420), the example BRIEF determiner 110 determines if the semantic label of the first sample position of the position pair is the same as the semantic label of the second sample position (block 408). As described above in conjunction with block 208 of FIG. 2, the example semantic labeler 108 labels each pixel (e.g., position) with the corresponding semantic label. If the example BRIEF determiner 110 determines that the semantic label of the first sample position of the position pair is the same as the semantic label of the second sample position (block 408: YES), the example BRIEF determiner 110 sets the semantic binary value for the sample position pair to one (e.g., $\tau(S,x_i,y_i):=1$) (block 410). If the example BRIEF determiner 110 determines that the semantic label of the first sample position of the position pair is not the same as the semantic label of the second sample position (block 408: NO), the example BRIEF determiner 110 sets the semantic binary value for the sample position pair to zero (e.g., $\tau(S,x_i,y_i):=0$) (block 412).

At block 414, the example BRIEF determiner 110 determines if the intensity of the first sample position of the position pair is less than the intensity of the second sample position. If the example BRIEF determiner 110 determines that the intensity of the first sample position of the position pair is less than the intensity of the second sample position (block 414: YES), the example BRIEF determiner 110 sets the intensity binary value for the sample position pair to one (e.g., $\tau(I,x_i,y_i):=1$) (block 416). If the example BRIEF determiner 110 determines that the intensity label of the first sample position of the position pair is not less than the intensity of the second sample position (block 414: NO), the example BRIEF determiner 110 sets the intensity binary value for the sample position pair to zero (e.g., $\tau(I,x_i,y_i):=0$) (block 418).

Once the semantic binary values and the intensity values have been determined for the sample position pairs, the example BRIEF determiner 110 determines the semantic BRIEF descriptor based on the semantic binary values (block 422). For example, the BRIEF determiner 110 utilizes the above Equation 4 to determine the semantic BRIEF descriptor. At block 424, the example BRIEF determiner 110 determines the intensity brief descriptor based on the intensity binary values. For example, the BRIEF determiner 110 utilizes the above Equation 5 to determines the intensity BRIEF descriptor. The process may return back to block 222 of FIG. 2 when the BRIEF determiner 110 performs the BRIEF descriptions of the selected key points.

Figure 5:
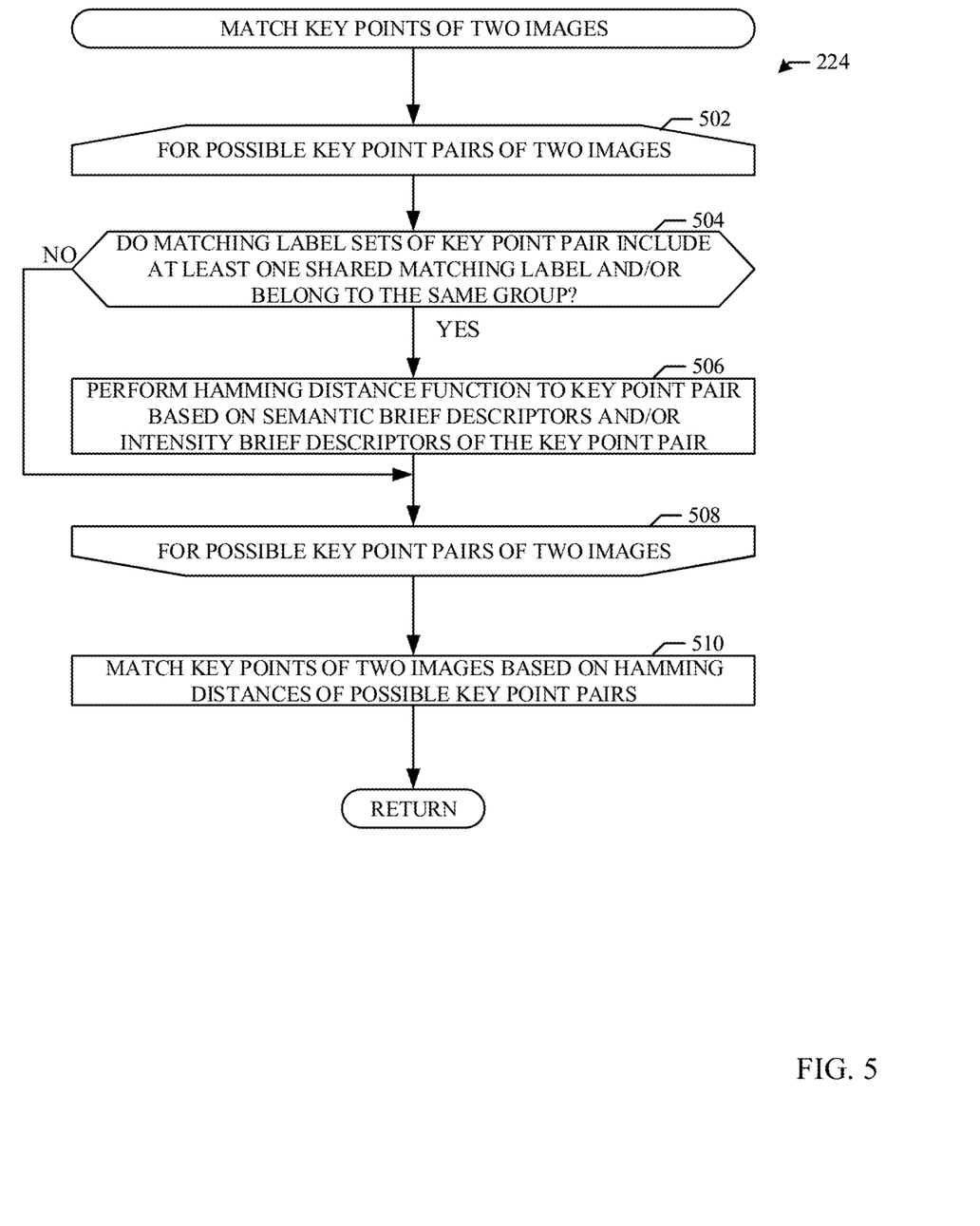

FIG. 5 illustrates an example flowchart 224 representative of example machine readable instructions that may be executed by the example image match determiner 100 of FIG. 1 to match key points of the two images, as described above in conjunction with block 224 of FIG. 2.

For all of the possible key point pairs of two images (block 502-block 508), the example key point matcher 112 determines if the matching label sets of the key point pair include at least one shared matching label and/or if the point pair belongs to the same group ("on the object boundary" or "within the object region") (block 504). For example, if a key point pair includes (A) a first key point that has a matching label corresponding to a bed and belongs to an "on the object boundary" group and (B) a second key point that has matching labels corresponding to a bed, a chair, and a picture frame and belongs to the "on the object boundary group," then the example key point matcher 112 determines that the matching label sets of the key point pair include at least one shared matching label (e.g., the chair) and belong to the same group.

If the example key point matcher 112 determines that the matching label sets of the key point pair does not include at least one shared matching label (block 504: NO), the process does match the possible key point pair and continues to block 508 to process a subsequent possible key point pair of the two images. If the example key point matcher 112 determines that the matching label sets of the key point pair does include at least one shared matching label (block 504: YES), the example key point matcher performs a hamming distance function to the key point pair based on the semantic brief descriptor (e.g., fS(p) and fS(q)) and/or intensity brief descriptors (e.g., fI(p) and fI(q)) of the key point pair (e.g., p and q) (block 506), as described above in conjunction with the Equation 6. Once all the possible key point pairs of the two images have been discarded or processed using the above Equation 6, the example key point matcher 112 matches key points of the two images based on the hamming distances of the possible key point pairs (e.g., using an argmin) (block 510), as described above in conjunction with Equation 7. After the example key point matcher 112 matches the key points of the two images, the process returns to block 226 of FIG. 2.

Figure 6:
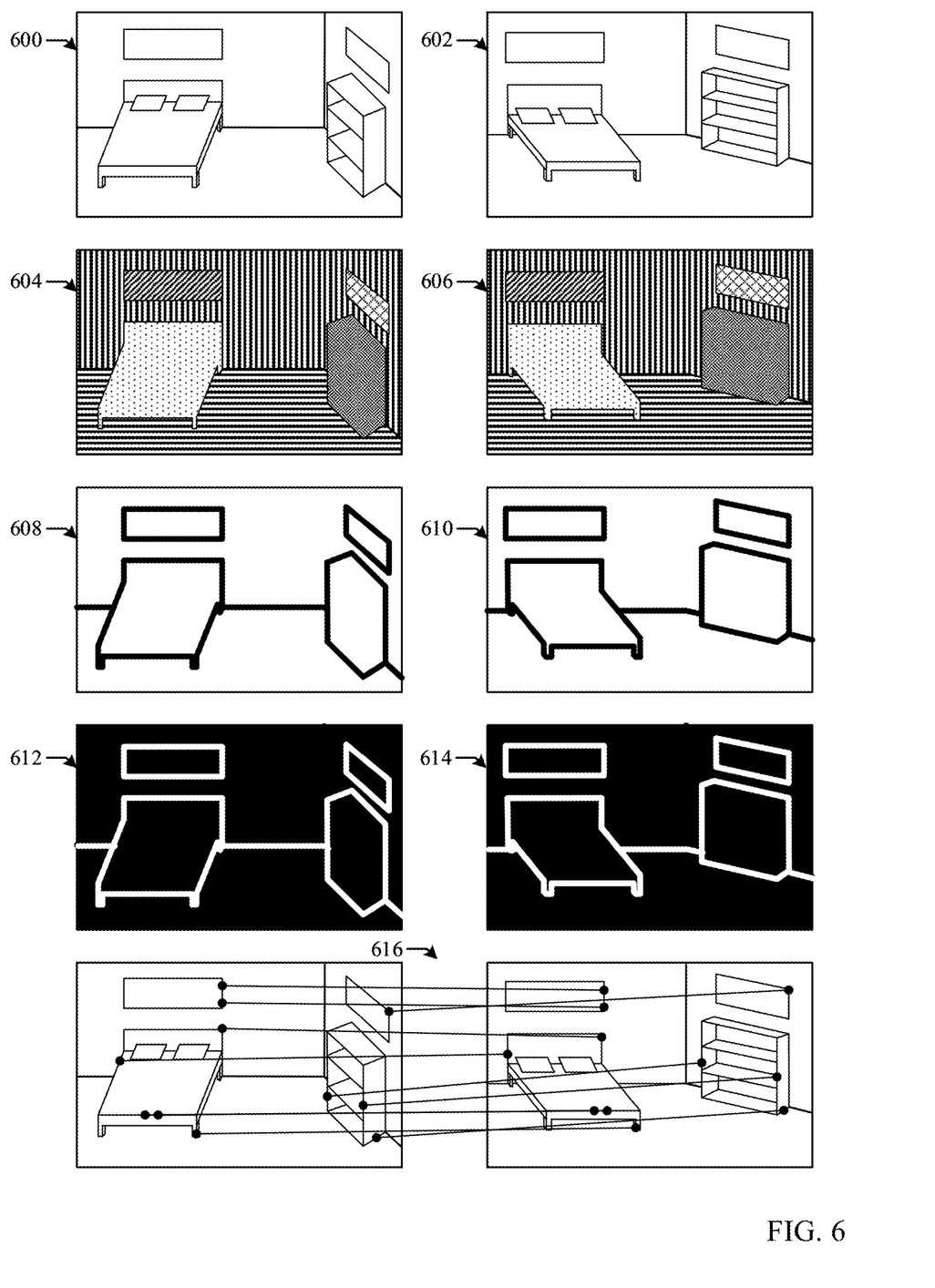
FIG. 6 illustrates two example images being processed by the example image match determiner of FIG. 1.

FIG. 6 illustrates two example images 600, 602 being processed by the example image match determiner 100 of FIG. 1. FIG. 6 includes the example images 600, 602, example semantic segmentation images 604, 606, example object masks 608, 610, example boundary masks 612, 614, and example key point matching 616.

When the example image match determiner 100 receives the two example images 600, 602, the example image match determiner 100 processes the images to match key points of the first image 600 to the second image 602. As described above, the example image match determiner 100 performs a semantic segmentation of the images 600, 602 and labels each pixel with a semantic label. The example semantic segmentation images 604, 606 correspond to the segmentations of the example images 600, 602. The example image match determiner 100 generates the example object masks 608, 610 and/or the example boundary masks 612, 614 based on the semantic semination images 604, 606. As described above, the example image match determiner 100 generates the object masks 608, 610 and/or the example boundary masks 612, 614 based on Equations 2 and 3. In some examples, the object masks 608, 610 and/or the boundary masks 612, 614 may be used to determine which points belong to which groups, as described above in conjunction with FIG. 1. The example key point matching 616 illustrates key points that have been matched by the example image match determiner 100 between the two images 602, 604.

Figure 7:
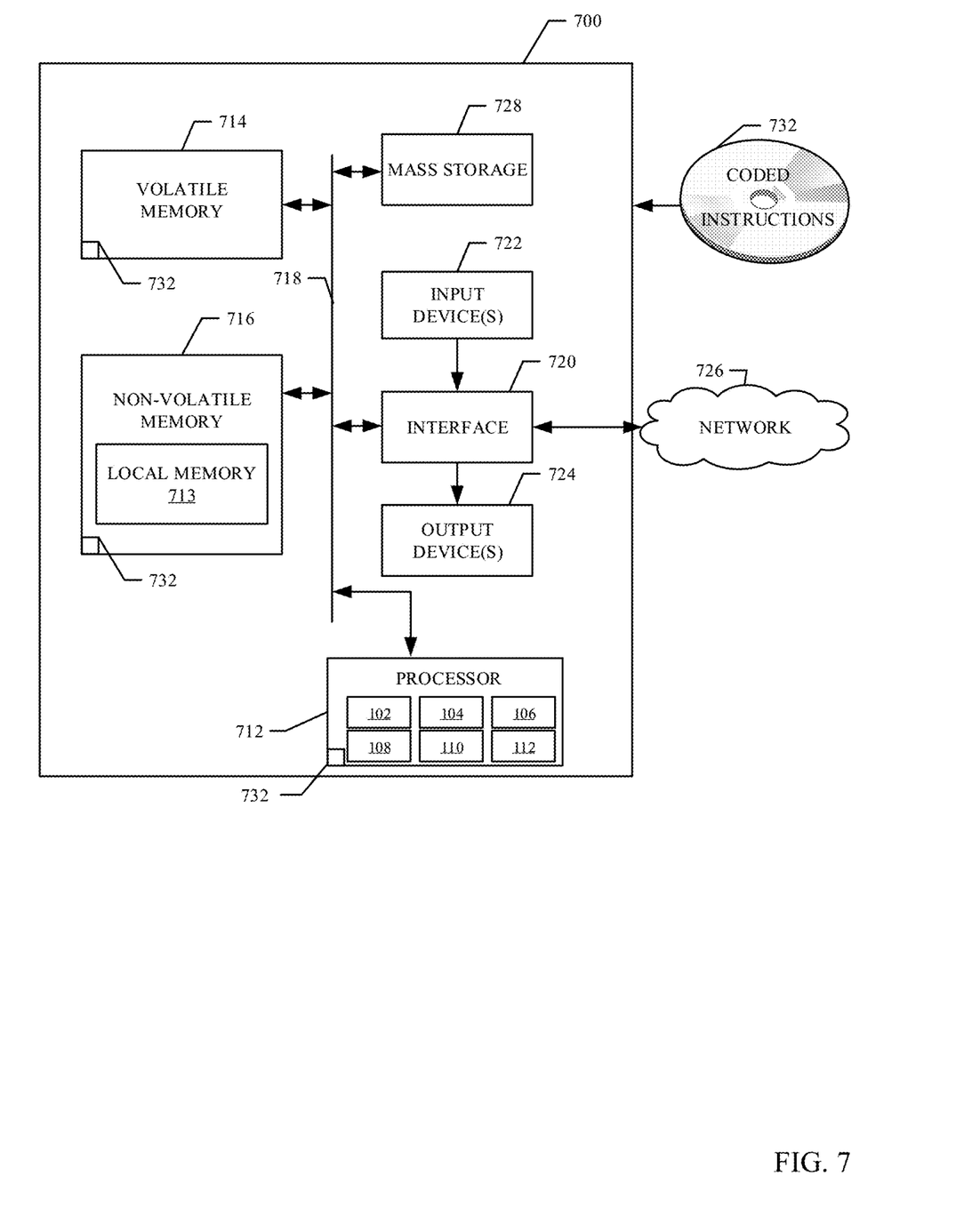
FIG. 7 is a block diagram of a processor platform structured to execute the example machine readable instructions of FIGS. 2-5 to implement the example image match determiner of FIG. 1.

FIG. 7 is a block diagram of an example processor platform 700 structured to execute the instructions of FIGS. 2-5 to implement the image match determiner 100 of FIG. 1. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the example interface 102, the example key point determiner 104, the example mask generator 106, the example semantic labeler 108, the example BRIEF determiner 110, and/or the example key point matcher 112 of FIG. 1.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 2-5 may be stored in the mass storage device 728, in the volatile memory 714, in the non-volatile memory 716, and/or on a removable non-transitory computer readable storage medium such as a CD or DVD.

Example 1 is an apparatus to match images using semantic features. Example 1 includes a semantic labeler to determine a semantic label for each of a first set of points of a first image and each of a second set of points of a second image, a binary robust independent element features (brief) determiner to determine semantic brief descriptors for a first subset of the first set of points and a second subset of the second set of points based on the semantic labels, and a point matcher to match first points of the first subset of points to second points of the second subset of points based on the semantic brief descriptors.

Example 2 includes the apparatus of example 1, further including a mask generator to generate a semantic segmentation of the first and second images, the semantic labeler to identify semantic objects based on the semantic segmentation and determine the semantic labels for the first and second sets of points based on the semantic objects.

Example 3 includes the apparatus of example 1, further including a key point determiner to select the first subset of points and the second subset of points based on an ordering of the points of the first and second sets of points, the ordering being based on where the points are located in the first and second images.

Example 4 includes the apparatus of example 1, wherein the brief determiner is to determine the semantic brief descriptors for the first and second sets of points based on semantic binary tests.

Example 5 includes the apparatus of example 1, wherein the brief determiner is to determine a brief descriptor of a first point of the first subset of points by selecting sample position pairs in a patch around a center of the first point, determining whether semantic labels of the sample position pairs match, setting semantic binary values based on the determinations of whether the semantic labels match, and determining the brief descriptor of the first point based on the semantic binary values.

Example 6 includes the apparatus of example 1, wherein the point matcher is to match the first points of the first set of points to the second points of the second set of points based on a hamming distance between the semantic brief descriptors of candidate point pairs between the first subset of points and the second subset of points.

Example 7 includes the apparatus of example 6, wherein the point matcher is to determine candidate point pairs based on at least one of corresponding to a common matching label or corresponding to a same group.

Example 8 includes the apparatus of example 7, wherein the semantic labeler is to determine the matching labels for the first subset of points and the second subset of points, the matching labels corresponding to at least one of semantic labels of the points or semantic labels of neighboring points.

Example 9 includes the apparatus of example 7, further including a key point determiner to divide points in the first and second sets of points into groups based on positions of the points in the first and second images.

Example 10 is a non-transitory computer readable storage medium comprising instructions which, when executed, cause a machine to at least determine a semantic label for each of a first set of points of a first image and each of a second set of points of a second image, determine semantic brief descriptors for a first subset of the first set of points and a second subset of the second set of points based on the semantic labels, and match first points of the first subset of points to second points of the second subset of points based on the semantic brief descriptors.

Example 11 includes the computer readable storage medium of example 10, wherein the instructions cause the machine to create a semantic segmentation of the first and second images, identify semantic objects based on the semantic segmentation, and determine the semantic labels for the first and second sets of points based on the semantic objects.

Example 12 includes the computer readable storage medium of example 10, wherein the instructions cause the machine to select the first subset of points and the second subset of points based on an ordering of the points of the first and second sets of points, the ordering being based on a location of the points within the first and second images.

Example 13 includes the computer readable storage medium of example 10, wherein the instructions cause the machine to determine the semantic brief descriptors by performing semantic binary tests with the first and second sets of points.

Example 14 includes the computer readable storage medium of example 10, wherein the instructions cause the machine to determine a brief descriptor of a first point of the first subset of points by selecting sample position pairs in a patch corresponding to the first point, determining whether a union of semantic labels of the sample position pairs include a matching label, determining semantic binary values based on whether the semantic labels match, and determining the brief descriptor of the first point based on the semantic binary values.

Example 15 includes the computer readable storage medium of example 10, wherein the instructions cause the machine to match the first points of the first set of points to the second points of the second set of points based on a distance function corresponding to the semantic brief descriptors of candidate point pairs between the first subset of points and the second subset of points.

Example 16 includes the computer readable storage medium of example 15, wherein the instructions cause the machine to select candidate point pairs based on at least one of corresponding to a common matching label or corresponding to a same group.

Example 17 includes the computer readable storage medium of example 16, wherein the instructions cause the machine to determine the matching labels for the first subset of points and the second subset of points, the matching labels corresponding to at least one of semantic labels of the points or semantic labels of neighboring points.

Example 18 includes the computer readable storage medium of example 16, wherein the instructions cause the machine to group points in the first and second sets of points into groups based on positions of the points in the first and second images.

Example 19 is a method to match images using semantic features. Example 19 includes determining a semantic label for each of a first set of points of a first image and each of a second set of points of a second image, determining semantic brief descriptors for a first subset of the first set of points and a second subset of the second set of points based on the semantic labels, and matching first points of the first subset of points to second points of the second subset of points based on the semantic brief descriptors.

Example 20 includes the method of example 19, further including generating a semantic segmentation of the first and second images, identify semantic objects based on the semantic segmentation, and determining the semantic labels for the first and second sets of points based on the semantic objects.

Example 21 includes the method of example 19, further including selecting the first subset of points and the second subset of points based on an ordering of the points of the first and second sets of points, the ordering being based on where the points are located in the first and second images.

Example 22 includes the method of example 19, further including determining the semantic brief descriptors for the first and second sets of points based on semantic binary tests.

Example 23 includes the method of example 19, further including determining a brief descriptor of a first point of the first subset of points by selecting sample position pairs in a patch around a center of the first point, determining whether semantic labels of the sample position pairs match, setting semantic binary values based on the determinations of whether the semantic labels match, and determining the brief descriptor of the first point based on the semantic binary values.

Example 24 includes the method of example 19, further including matching the first points of the first set of points to the second points of the second set of points based on a hamming distance between the semantic brief descriptors of candidate point pairs between the first subset of points and the second subset of points.

Example 25 includes the method of example 24, further including determining candidate point pairs based on at least one of corresponding to a common matching label or corresponding to a same group.

From the foregoing, it would be appreciated that the above disclosed method, apparatus, and articles of manufacture to match images using semantic features. Examples disclosed herein include a new point description that combines the high level semantic features and low-level intensity features, thereby providing a more complete image representation and a more accurate point matching. Using examples disclosed herein, key points of two images are assigned with a set of candidate matching labels and point matching is conducted between points that have the same semantic label, thereby corresponding to a significant reduction of point mismatching. Examples disclosed herein provide a more accurate point matching then the above-described conventional techniques with less conventional time than some conventional techniques.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to match images using semantic features, the apparatus comprising:
    interface circuitry to obtain a first set of points of a first image and respective ones of a second set of points of a second image;
    semantic labeler software to determine a semantic label for respective ones of the first set of points of the first image and respective ones of the second set of points of the second image;
    binary robust independent element features (BRIEF) determiner software to:
        determine semantic BRIEF descriptors for a first subset of the first set of points and a second subset of the second set of points based on semantic binary tests using the semantic labels;
        determine intensity BRIEF descriptors for the first subset of the first set of points and the second subset of the second set of points based on intensity information; and
        determine final BRIEF descriptors based on the semantic BRIEF descriptors and the intensity BRIEF descriptors; and
    point matcher software to match first points of the first subset of the first set of points to second points of the second subset of the second set of points based on the final BRIEF descriptors.

2. The apparatus of claim 1, further including mask generator software to generate a semantic segmentation of the first and second images, the semantic labeler software to identify semantic objects based on the semantic segmentation, the mask generator software to determine the semantic labels for the first and second sets of points based on the semantic objects.

3. The apparatus of claim 1, further including key point determiner software to select the first subset of the first set of points and the second subset of the second set of points based on an ordering of the points of the first and second sets of points, the ordering being based on where the points are located in the first and second images.

4. The apparatus of claim 1, wherein the BRIEF determiner software is to determine a BRIEF descriptor of a first point of the first subset of the first set of points by:
    selecting sample position pairs in a patch around a center of the first point;
    determining whether the semantic labels of the sample position pairs match;
    setting semantic binary values based on the determinations of whether the semantic labels match; and
    determining the BRIEF descriptor of the first point based on the semantic binary values.

5. The apparatus of claim 1, wherein the point matcher software is to match the first points of the first set of points to the second points of the second set of points based on a Hamming distance between the semantic BRIEF descriptors of candidate point pairs between the first subset of the first set of points and the second subset of the second set of points.

6. The apparatus of claim 5, wherein the point matcher software is to determine candidate point pairs based on at least one of a common matching label or corresponding to a same group.

7. The apparatus of claim 6, wherein the semantic labeler software is to determine matching labels for the first subset of the first set of points and the second subset of the second set of points, the matching labels corresponding to at least one of semantic labels of the points or semantic labels of neighboring points.

8. The apparatus of claim 6, further including key point determiner software to divide points in the first and second sets of points into groups based on positions of the points in the first and second images.

9. A non-transitory computer readable storage medium comprising instructions which, when executed, cause a machine to at least:
   determine a semantic label for respective ones of a first set of points of a first image and respective ones of a second set of points of a second image;
   determine semantic BRIEF descriptors for a first subset of the first set of points and a second subset of the second set of points based on semantic binary tests associated with the semantic labels;
   determine intensity BRIEF descriptors for the first subset of the first set of points and the second subset of the second set of points based on intensity information; and
   determine final BRIEF descriptors based on the semantic BRIEF descriptors and the intensity BRIEF descriptors; and
   match first points of the first subset of the first set of points to second points of the second subset of the second set of points based on the final BRIEF descriptors.

10. The non-transitory computer readable storage medium of claim 9, wherein the instructions cause the machine to:
    create a semantic segmentation of the first and second images;
    identify semantic objects based on the semantic segmentation; and
    determine the semantic labels for the first and second sets of points based on the semantic objects.

11. The non-transitory computer readable storage medium of claim 9, wherein the instructions cause the machine to select the first subset of the first set of points and the second subset of the second set of points based on an ordering of the points of the first and second sets of points, the ordering being based on a location of the points within the first and second images.

12. The non-transitory computer readable storage medium of claim 9, wherein the instructions cause the machine to determine a BRIEF descriptor of a first point of the first subset of the first set of points by:
    selecting sample position pairs in a patch corresponding to the first point;
    determining whether a union of the semantic labels of the sample position pairs include a matching label;
    determining semantic binary values based on whether the semantic labels match; and
    determining the BRIEF descriptor of the first point based on the semantic binary values.

13. The non-transitory computer readable storage medium of claim 9, wherein the instructions cause the machine to match the first points of the first set of points to the second points of the second set of points based on a distance function corresponding to the semantic BRIEF descriptors of candidate point pairs between the first subset of the first set of points and the second subset of the second set of points.

14. The non-transitory computer readable storage medium of claim 13, wherein the instructions cause the machine to select candidate point pairs based on at least one of a common matching label or corresponding to a same group.

15. The non-transitory computer readable storage medium of claim 14, wherein the instructions cause the machine to determine matching labels for the first subset of the first set of points and the second subset of the second set of points, the matching labels corresponding to at least one of semantic labels of the points or semantic labels of neighboring points.

16. The non-transitory computer readable storage medium of claim 14, wherein the instructions cause the machine to group points in the first and second sets of points into groups based on positions of the points in the first and second images.

17. A method to match images using semantic features, the method comprising:
    determining a semantic label for respective ones of a first set of points of a first image and respective ones of a second set of points of a second image;
    determining, by executing an instruction with one or more processors, semantic BRIEF descriptors for a first subset of the first set of points and a second subset of the second set of points based on the semantic labels by:
        selecting sample position pairs in patches around centers of points of the first subset of the first set of points;
        determining whether semantic labels of the sample position pairs match;
        setting semantic binary values based on the determination of whether the semantic labels match; and
        determining the semantic BRIEF descriptors for the points based on the semantic binary values; and
    matching first points of the first subset of the first set of points to second points of the second subset of the second set of points based on the semantic BRIEF descriptors.

18. The method of claim 17, further including:
    generating a semantic segmentation of the first and second images;
    identify semantic objects based on the semantic segmentation; and
    determining the semantic labels for the first and second sets of points based on the semantic objects.

19. The method of claim 17, further including selecting the first subset of the first set of points and the second subset of the second set of points based on an ordering of the points of the first and second sets of points, the ordering being based on where the points are located in the first and second images.

20. The method of claim 17, further including determining the semantic BRIEF descriptors for the first and second sets of points based on semantic binary tests.

21. The method of claim 17, further including matching the first points of the first set of points to the second points of the second set of points based on a Hamming distance between the semantic BRIEF descriptors of candidate point pairs between the first subset of the first set of points and the second subset of the second set of points.

22. The method of claim 21, further including determining candidate point pairs based on at least one of a common matching label or corresponding to a same group.

23. An apparatus to match images using semantic features, the apparatus comprising:
- memory;
- instructions; and
- processor circuitry to execute the instructions to:
  - determine a semantic label for respective ones of a first set of points of a first image and respective ones of a second set of points of a second image;
  - determine semantic BRIEF descriptors for a first subset of the first set of points and a second subset of the second set of points based on semantic binary tests of the semantic labels;
  - determine intensity BRIEF descriptors for the first subset of the first set of points and the second subset of the second set of points based on intensity information; and
  - determine final BRIEF descriptors based on the semantic BRIEF descriptors and the intensity BRIEF descriptors; and
  - match first points of the first subset of the first set of points to second points of the second subset of the second set of points based on the final BRIEF descriptors.

24. The apparatus of claim 23, wherein the processor circuitry is to:
- create a semantic segmentation of the first and second images;
- identify semantic objects based on the semantic segmentation; and
- determine the semantic labels for the first and second sets of points based on the semantic objects.

25. The apparatus of claim 23, wherein the processor circuitry is to select the first subset of the first set of points and the second subset of the second set of points based on an ordering of the points of the first and second sets of points, the ordering being based on a location of the points within the first and second images.

26. The apparatus of claim 23, wherein the processor circuitry is to output an identification of one or more objects in the first image or the second image based on a first final BRIEF descriptor associated with first ones of the first points and a second final BRIEF descriptor associated with second ones of the second points.

27. The apparatus of claim 23, wherein the processor circuitry is to output an identification of one or more objects in the first image or the second image based on the match of first ones of the first points and second ones of the second points.

* * * * *